March 13, 1945.  D. NIELD  2,371,595
LOCKING FOR SCREW THREADED MALE MEMBERS
Filed March 4, 1944
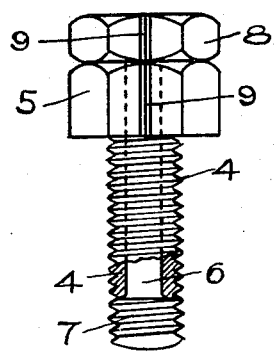
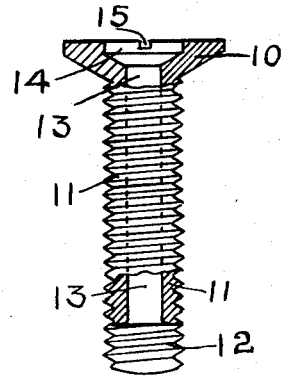
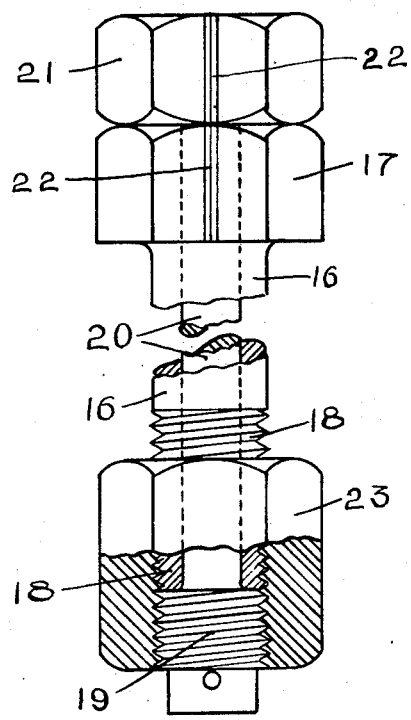
INVENTOR.
D. NIELD
per Norman S. Barlow
ATTORNEY.

UNITED STATES PATENT OFFICE 2,371,595

LOCKING FOR SCREW THREADED MALE PARTS

Douglas Nield, Dinas Powis, Wales

Application March 4, 1944, Serial No. 524,994
In Great Britain March 27, 1943

1 Claim. (Cl. 151—14)

This invention comprises improvements in the locking of screw threaded male parts and refers more particularly to set screws and bolts. The object of this invention is to prevent the set screw or bolt unscrewing with vibration or strain.

Referring to the drawings—

Figure 1 is an elevation, partly in section of a set screw according to this invention.

Figure 2 shows an elevation, partly in section, of another type of set screw according to this invention, whilst, Figure 3 is an elevation partly in section, of a bolt according to this invention.

In carrying the present invention into practice, as shown upon the accompanying drawing, at Figure 1, the set screw 4 has an hexagonal head 5. These portions of the set screw are coaxially bored to accommodate a rotatable core 6, to the lower end of which is secured or formed the threaded extension 7, which in effect is an extension of the threaded part 4 of the set screw. The thread on this part 7 being a continuation of the thread on the part 4.

To the upper end of the core 6 is secured by welding or in any other suitable manner the hexagonal headed part 8 which is adapted to coincide with the head 5 of the set pin, so that a spanner or the like can be fitted onto the heads 5 and 8 at the same time for screwing the stud into position or for withdrawing same.

In order to indicate that the thread extension 7 is in its correct relation to the main part 4 of the stud an indicating mark 9 is provided on the two heads 5 and 8. When it is desired to insert or withdraw the stud, these indicating marks 9 are brought into alignment.

To lock the stud after it has been placed in position, the screwed extension 7 is given a partial turn in either direction, by means of the head 8, so that the thread on the extension 7 is thrown out of pitch with the thread on the part 4 of the stud, thus locking the stud in position and preventing same screwing out of the screwed hole in which it has been positioned.

Figure 2 of the drawing shows a threaded stud, having a countersunk head 10, the main screwed part 11 of the stud has an extension 12 to which is secured the core 13 positioned in and rotatable in the coaxial bore of the stud. The upper end of the core 13 is provided with the head 14 which is countersunk into the head 10.

The heads 10 and 14 are provided with a slot 15 which indicates, when the slot 15 is in alignment in the heads 10 and 14, that the screw thread on the main part 11 and extension 12 of the stud is in continuity for the insertion or withdrawal of the stud.

The operation for locking the stud in position is similar to that described with reference to Figure 1, except that a screw driver would be used in the slot 15 for rotating the stud.

Figure 3 shows the application of this invention to a bolt, in which the shank 16 of the bolt is provided with a hexagonal head 17 and a screwed part 18. The shank 16 and head 17 of the bolt are bored out concentrically.

An extension 19 of the screwed part 18 of the bolt is provided, which extension 19 has a core 20 formed integral therewith or secured thereto, in any suitable manner, which extends the length of the bolt and head 17. To the core 20 is attached by welding or other suitable means the hexagonal part 21 which coincides with the hexagonal bolt head 17.

The thread on the extension 19 is adapted to form a continuity of the thread on the screwed part 18 of the bolt and to indicate when the two parts of the thread are in continuity, the bolt head 17 and the part 21 are provided with an indicating slot or marking 22, which are brought into alignment with the continuity of the screw thread on the two parts 18 and 19 are required.

It will be seen, that when the nut 23 is screwed onto the shank 16 of the bolt, to lock the bolt to the nut 23, a partial rotation in either direction of the hexagonal part 21 will throw the pitch of the thread on the extension 19 out of relation with the pitch of the thread on the screwed part 18 of the bolt and thus lock the bolt to the nut 23.

It will be noted that variations may be made particularly with the method of attachment of the parts 8, 19 and also with the methods provided for rotating these parts, without affecting the scope of the claim.

I claim:

Improvements in the locking of screwed male parts, comprising in combination a main threaded part having a coaxial bore therein, a separate threaded extension of said main threaded part forming a continuity thereof, a core forming an extension of said separate threaded part and being positioned in the coaxial bore of the main threaded part and a headed member attached to said core for rotating the separate threaded part to throw the thread on same out of pitch with the thread on the main threaded part to lock the screwed male part in position.

DOUGLAS NIELD.